Sept. 23, 1941.  C. A. NERACHER ET AL  2,256,960
POWER TRANSMISSION
Filed Dec. 11, 1939
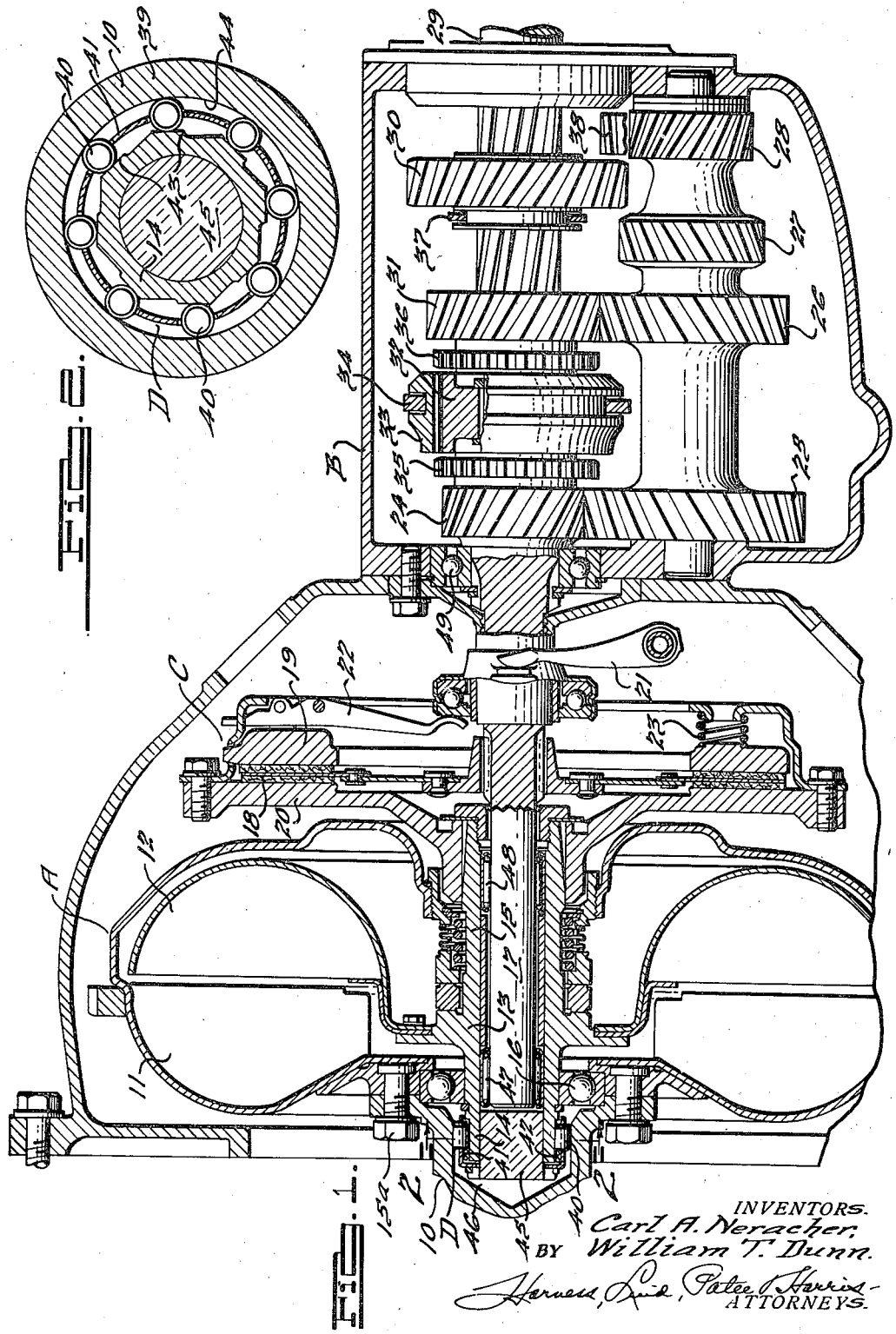
INVENTORS.
Carl A. Neracher,
BY William T. Dunn.
Harness, Dick, Patee & Harris
ATTORNEYS.

Patented Sept. 23, 1941

2,256,960

UNITED STATES PATENT OFFICE 2,256,960

POWER TRANSMISSION

Carl A. Neracher and William T. Dunn, Detroit, Mich., assignors to Chrysler Corporation, Highland Park, Mich., a corporation of Delaware Application December 11, 1939, Serial No. 308,512

2 Claims. (Cl. 192—3.2)

This invention relates to power transmissions for transmitting power from the engine to the driving ground wheels of motor vehicles.

The invention is more particularly directed to vehicle driving systems incorporating a fluid coupling or equivalent form of slip drive through which power is transmitted from the engine.

In many driving systems incorporating fluid couplings, certain objectionable characteristics are experienced by reason of the absence of positive couple between the engine and vehicle driving wheels, whereas with more conventional driving systems, employing the usual main friction-type clutch there is provided, when such clutch is engaged, a two-way non-slip connection from the engine to the transmission so that by leaving the transmission in a driving speed ratio, the engine is directly coupled with the vehicle driving wheels and may therefore be used in parking to prevent undesired vehicle roll. With many fluid coupling systems, on the other hand, the engine has a fluid slip connection through the transmission to the vehicle driving ground wheels preventing use of the engine as a vehicle parking medium.

It is an object of our invention to overcome the aforesaid disadvantages in fluid coupling drive systems by providing a simple device whereby the engine is coupled to the vehicle drive wheels such that the fluid coupling may be circumvented and the engine used to hold the vehicle on up-grades as well as on down-grades.

Another object of our invention is to overcome the aforesaid difficulties by the provision of means automatically operating to effect positive drive connection between driving and driven members of a fluid coupling under desired conditions, while at other times allowing the normal slip driving functions of the fluid coupling to take place.

Further objects of our invention are to provide means for allowing normal drive functions of a fluid coupling to take place while preventing the engine from falling below the speed of the coupling driven member. Fluid couplings have an inherent tendency to produce engine stalling at lower engine speed ranges and our invention overcomes this tendency by forcing the engine, irrespective of the fluid medium in the coupling, to take the drive from the coupling driven member when the normal direction of torque flow is reversed.

Further advantages arising from our invention reside in an arrangement of the character described which operates to facilitate starting a dead engine by towing the car, our device operating under such conditions to positively drive the engine without depending on circulation of the fluid medium to effect a drive to the engine.

Another advantage of our invention resides in the provision of improved braking conditions in fluid coupling systems as, when the vehicle tends to coast, the engine is drivingly coupled with the vehicle ground wheels more quickly than where such drive is dependent on the fluid medium. Our couple in such instances is of a positive nature, free from fluid slip which is undesirable under such conditions.

An additional object of our invention is to provide an improved assembly of the rotating parts of a fluid coupling drive system whereby improved balance and support of the parts are provided.

Further objects and advantages of our invention will be apparent from the following detailed description of one embodiment thereof, reference being had to the accompanying drawing in which:

Fig. 1 is a sectional elevational view through a typical power transmission incorporating our invention, and Fig. 2 is a detail sectional elevational view taken along line 2—2 of Fig. 1.

Referring to the drawing, we have illustrated our invention in conjunction with a fluid coupling A interposed between the engine and a transmission B which, for simplicity of illustration, is shown of conventional type.

The engine crankshaft 10 drives the fluid coupling impeller structure 11 which, in turn, causes circulation of the fluid medium to the runner structure 12 in a manner well known for the kinetic type of fluid coupling illustrated. Runner 12 is mounted on a hollow hub or shaft 13 which has forwardly and rearwardly extending driving portions 14 and 15 respectively. An anti-friction bearing 16 centers the forward end of the hub 13 and also the forward end of the transmission drive shaft 17 which is journaled in the hollow hub ends 14 and 15. Fasteners 15a serve to connect the impeller structure 11 with the crankshaft 10.

The drive shaft 17 is illustrated as having fixed thereto a driven clutch disk 18 for frictional clutching between driving clutch parts 19, 20 which comprise driving extensions of hub portion 15. For releasing this clutch C to disconnect runner 12 from shaft 17 we have shown a conventional throwout mechanism 21 operating through levers 22 to release part 19 against the clutch-loading springs 23.

The transmission B comprises the usual main drive pinion 24 fixed to shaft 17 and meshing with gear 25 of the countershaft cluster which comprises the countershaft second speed gear 26, and the low and reverse gears 27, 28. The transmission output shaft or tailshaft 29 is, as usual, geared through the rear axle (not shown) to turn with the vehicle rear ground wheels and has rotatably fixed thereto a slidable low and reverse gear 30 and an axially stationary second speed gear 31 meshing with countershaft gear 26.

Fixed to the forward end of shaft 29 is a hub 32 slidably carrying clutch sleeve 33 shiftable by yoke 34 forwardly to clutch with the teeth 35 of pinion 24 or rearwardly to clutch with teeth 36 of gear 31. Gear 30 is shifted by yoke 37 forwardly to mesh with gear 27 or rearwardly to mesh with a reverse idler gear 38 which is in constant mesh with gear 28.

The transmission B is illustrated in neutral and clutch C in its normally engaged condition of drivingly connecting runner 12 with the shaft 17. Manipulation of shift yokes 34, 37 is accomplished in any suitable manner facilitated by momentary release of clutch C. Low is obtained by shifting gear 30 forwardly, second by shifting sleeve 33 rearwardly, direct by shifting sleeve 33 forwardly, and reverse by shifting gear 30 rearwardly. In all forward speed ratios the direction of engine crankshaft rotation (clockwise as at 39 in Fig. 2) may be referred to as forward rotation corresponding in direction with the rotation of runner 12 and shafts 17 and 29. Shaft 29 will, of course, rotate at a speed proportionate to that of shaft 17 depending on the selection of the forward speeds of the transmission. When the transmission is in reverse, as for driving the vehicle backwards, the forward rotation of the engine crankshaft and shaft 17 will now drive shaft 29 backward through the reverse gearing 24, 25, 28, 38 and 30.

As thus far described, it will be apparent that, with transmission B set for one of its forward drives, the crankshaft 10 drives the impeller 11 such that fluid circulated thereby will drive runner 12 with slip which rapidly decreases as the engine speeds up above idling. The drive passes from runner 12 through transmission B and thence to shaft 29 to drive the vehicle. On coasting, the torque reverses in direction from the shaft 29 forwardly through transmission B, clutch C, and thence through fluid coupling A to crankshaft 10. The fluid coupling A, as usual, operates the same for either direction of torque flow therethrough.

It will be apparent that, with the mechanism as thus far described, the engine cannot be used to brake the vehicle for parking by reason of the fluid slip in the coupling A; also, at low speeds the engine could stall even though shaft 17 were geared to the vehicle drive wheels.

In order to overcome the foregoing disadvantages, and with further objects in view, we provide an automatically releasable drive connection at some convenient point preferably between crankshaft 10 and impeller 11 on the one hand, and runner 12 on the other hand. This automatic means may be in the form of an overrunning clutch D which, in and of itself, is of well known form comprising clutching rollers 40 spaced by a cage 41 yieldingly urged counterclockwise by a spring 42. One part coacting with the rollers, such as hub portion 14, is provided with a cam 43 at each roller. The other part is cylindrical at 44. The cams are so arranged as to pinch or grip the rollers 40 whenever the forward rotation of crankshaft 10 tends to fall below that of hub 13 whereupon these parts are locked together. However, the rollers 40 immediately release to allow the crankshaft 10 to freely rotate forwardly faster than hub 13.

By reason of the foregoing arrangement, the engine may be used as a parking brake when the vehicle is left standing on an up-grade as well as on a down-grade. When on a down-grade the transmission B is left in any forward drive ratio, preferably low, whereupon it will be apparent that tendency of the car to roll forwardly will cause forward rotation of shaft 29 and also forward rotation of hub 13 acting through gearing 30, 27, 25, 24 and clutch C. As the engine is "dead," the tendency of hub 13 to rotate forwardly will pinch rollers 40 and hold hub 13 locked to the stationary crankshaft thereby also preventing the car from rolling down-grade.

In the case of parking on an up-grade, the transmission B is left in the reverse drive setting whereupon tendency of the car to roll backwardly will likewise cause the overrunning device D to lock and thereby hold the car against movement. This is so because when the car starts to roll backwardly, the engine being dead, shaft 29 turns backward but shaft 17 and hub 13 turn forward by reason of the reverse gearing 30, 38, 28, 25 and 24.

During drive of the vehicle by the engine, the overrunning device D does not interfere with the normal desired functions of the fluid coupling A because the engine crankshaft 10 and impeller 11 are then always permitted to freely rotate faster than runner 12 and hub 13. During car coasting, the device D has the advantage of immediately coming into action to establish a positive driving couple from shaft 29 to crankshaft 10 thereby positively braking against the engine without having to wait for the fluid to establish the drive from the runner to the impeller and without having to depend on the fluid drive which, at the lower driving speeds, entails so much slip as to provide very inefficient braking by the engine.

The device D has the further advantage of greatly facilitating starting a dead engine by towing the car. With transmission B set for a forward speed, preferably high, the car may be towed forwardly and immediately the device D locks to cause the engine to turn over without having to reach a car speed sufficient to circulate fluid in the coupling B sufficiently to establish a drive from runner 12 to impeller 11.

In order to provide the desired rigidity for the hollow portion 14 of hub 13 and at the same time seal this hub against escape of the coupling fluid, we insert a cylinder plug 45 by a press fit in the forward end of hub portion 14 adjacent the forward end of shaft 17 and within the rear hollow end 46 of the crankshaft 10. This arrangement concentrically positions the forward anti-friction bearing 47 between shaft 17 and hub 13 and within bearing 16 so that the latter bearing centers and takes the loads directly from shaft 17 as well as from hub 13. A second bearing 48 journals shaft 17 in hub portion 15 and shaft 17 is journalled by an anti-friction ball bearing 49 in the casing of transmission B. The bearings 16 and 49 act as universal joints to compensate for minor misalignment in the assembly of the parts, it being noted that slight tilt of shaft 17 preserves running balance of runner 12 and clutch C as this whole assembly maintains its center with shaft 17.

It will be understood that our reference to "forward" and "backward" directions of rotation are used for convenience of reference to relative directions of rotations and not by way of limitation of any particular rotational direction.

If desired, the transmission could also have, within its casing or as an auxiliary behind it, an overdrive gear ratio greater than 1 to 1 in which event the final tailshaft would operate at a speed faster than that of the engine, when in overdrive. In any event the device D will nevertheless still automatically operate, when driving the vehicle, to prevent the engine from dropping below a predetermined speed proportionate to the rotational speed of the tailshaft depending on the particular gearing ratio, as when the vehicle goes down a steep grade or when the driver releases the customary accelerator pedal. In each instance the car will then transmit positive drive to the engine by a reversal in the direction of torque flow between the engine and tailshaft, this drive being independent of the fluid medium circulated by operation of the fluid coupling. The drive from the engine to the tailshaft 29, acting through fluid coupling A, clutch C and transmission B, may be said to "bridge" or drive around the overrunning clutch D which serves to establish drive connection from the tailshaft to the engine crankshaft through the transmission B and clutch C but independently of the fluid coupling.

Because of the slip in fluid coupling A, crankshaft 10 will always drive faster than shaft 15 in transmitting drive to the tailshaft 29. This slip is very small at high engine speeds but serves to produce overrun at device D whenever the engine drives the vehicle. Therefore, the device D does not interfere with the normal slip characteristics of the fluid coupling but is always ready to establish drive to the engine independently of the fluid coupling.

We claim:

1. In a drive for a motor vehicle, a driving structure comprising a driving shaft and a fluid coupling impeller mounted on the driving shaft, a driven shaft disposed coaxially with the driving shaft, a hollow hub mounted on the forward end of the driven shaft and adapted to transmit drive from the driving shaft to the driven shaft, said driving shaft having a rear hollow end portion receiving the forward end portion of said hollow hub therewithin, an anti-friction bearing journalling said end portion of said hub in said driving structure, a fluid coupling runner mounted on said hollow hub rearwardly adjacent said bearing and adapted to be driven by said impeller, and overrunning clutch means disposed forwardly adjacent said bearing for operation between said hollow hub and said hollow end portion of the driving shaft, said overrunning clutch means being automatically operable to drivingly connect said hub with said driving shaft in response to tendency of the driving shaft to drop below the speed of rotation of the hub while releasing this driving connection in response to tendency of the driving shaft to rotate faster than the hub.

2. In a drive according to claim 1, a plug fitting within the forward end of said hollow hub for sealing the forward end of the hollow hub against escape of fluid from the fluid coupling, said plug being disposed radially within said overrunning clutch means for reinforcing the forward end of the hollow hub.

CARL A. NERACHER.
WILLIAM T. DUNN.